United States Patent
O'Brien-Strain et al.

(10) Patent No.: US 8,301,669 B2
(45) Date of Patent: Oct. 30, 2012

(54) CONCURRENT PRESENTATION OF VIDEO SEGMENTS ENABLING RAPID VIDEO FILE COMPREHENSION

(75) Inventors: Eamonn O'Brien-Strain, San Francisco, CA (US); Simon Widdowson, Dublin, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1672 days.

(21) Appl. No.: 11/669,611

(22) Filed: Jan. 31, 2007

(65) Prior Publication Data

US 2008/0184120 A1 Jul. 31, 2008

(51) Int. Cl.
*G06F 7/00* (2006.01)

(52) U.S. Cl. ............... 707/809; 707/830; 725/44

(58) Field of Classification Search ........... 707/634, 707/755, 809; 715/202, 704, 723, 730, 731, 715/732; 725/44
See application file for complete search history.

(56) References Cited

U.S. PATENT DOCUMENTS

| | | | |
|---|---|---|---|
| 6,118,493 A | 9/2000 | Duhault et al. | |
| 6,226,655 B1 | 5/2001 | Borman et al. | |
| 6,538,665 B2 | 3/2003 | Crow et al. | |
| 6,570,587 B1 | 5/2003 | Efrat et al. | |
| 6,693,652 B1 | 2/2004 | Barrus et al. | |
| 7,149,974 B2 | 12/2006 | Girgensohn et al. | |
| 7,614,064 B2 * | 11/2009 | Zigmond | 725/9 |
| 2002/0105535 A1 * | 8/2002 | Wallace et al. | 345/719 |
| 2002/0163532 A1 | 11/2002 | Thomas et al. | |
| 2003/0009469 A1 | 1/2003 | Platt et al. | |
| 2003/0184579 A1 | 10/2003 | Zhang et al. | |
| 2004/0095396 A1 | 5/2004 | Stavely et al. | |
| 2005/0002647 A1 | 1/2005 | Girgensohn et al. | |
| 2005/0235312 A1 | 10/2005 | Karaoguz et al. | |
| 2007/0074115 A1 * | 3/2007 | Patten et al. | 715/716 |

FOREIGN PATENT DOCUMENTS

| | | |
|---|---|---|
| KR | 10-20010050167 A1 | 6/2001 |
| WO | WO01/27876 A1 | 4/2001 |

* cited by examiner

*Primary Examiner* — Amy Ng

(57) ABSTRACT

A concurrent presentation of video segments of a video file enables rapid comprehension of the video file. A video file is segmented into video segments and a condensed representation of the video file is generated. The condensed representation corresponds to a concurrent presentation of the video segments in respective windows in a display area over repeating cycles of a loop period. The concurrent presentation may be processed to concurrently present video segments corresponding to contiguous sections of the video file in respective windows in a display area over repeating cycles of a loop period.

16 Claims, 7 Drawing Sheets

```
video_file = video_1
num_segments = 12
v_seg_62:    x62_start, y1_start      x62_end, y62_end
v_seg_64:    x64_start, y64_start     x64_end, y64_end
v_seg_66:    x66_start, y66_start     x66_end, y66_end
v_seg_68:    x68_start, y68_start     x68_end, y68_end
v_seg_70:    x70_start, y70_start     x70_end, y70_end
v_seg_72:    x72_start, y72_start     x72_end, y72_end
v_seg_74:    x74_start, y74_start     x74_end, y74_end
v_seg_76:    x76_start, y76_start     x76_end, y76_end
v_seg_78:    x78_start, y78_start     x78_end, y78_end
v_seg_80:    x80_start, y80_start     x80_end, y80_end
v_seg_82:    x82_start, y82_start     x82_end, y82_end
v_seg_84:    x84_start, y84_start     x84_end, y84_end
```

FIG. 8

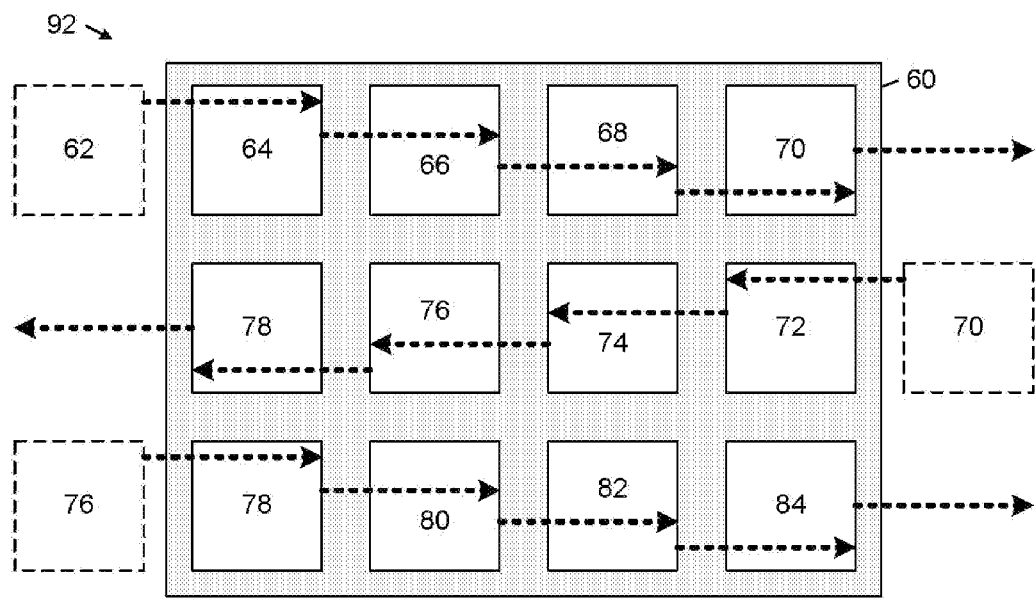

FIG. 9

CONCURRENT PRESENTATION OF VIDEO SEGMENTS ENABLING RAPID VIDEO FILE COMPREHENSION

BACKGROUND

Individuals and organizations are rapidly accumulating large collections of video content. As these collections grow in number and diversity, individuals and organizations increasingly will require systems and methods for organizing and browsing the video content in their collections. To meet this need, a variety of different systems and methods for browsing video content have been proposed.

For example, storyboard browsing has been developed for browsing full-motion video content. In accordance with this technique, video information is condensed into meaningful representative snapshots and corresponding audio content. One known video browser of this type divides a video sequence into equal length segments and denotes the first frame of each segment as its key frame. Another known video browser of this type stacks every frame of the sequence and provides the user with rich information regarding the camera and object motions.

Content-based video browsing techniques also have been proposed. In these techniques, a long video sequence typically is classified into story units based on video content. In some approaches, scene change detection (also called temporal segmentation of video) is used to give an indication of when a new shot starts and ends. Scene change detection algorithms, such as scene transition detection algorithms based on DCT (Discrete Cosine Transform) coefficients of an encoded image, and algorithms that are configured to identify both abrupt and gradual scene transitions using the DCT coefficients of an encoded video sequence are known in the art.

In one video browsing approach, Rframes (representative frames) are used to organize the visual contents of video clips. Rframes may be grouped according to various criteria to aid the user in identifying the desired material. In this approach, the user may select a key frame, and the system then uses various criteria to search for similar key frames and present them to the user as a group. The user may search representative frames from the groups, rather than the complete set of key frames, to identify scenes of interest. Language-based models have been used to match incoming video sequences with the expected grammatical elements of a news broadcast. In addition, a priori models of the expected content of a video clip have been used to parse the clip.

Another approach extracts a hierarchical decomposition of a complex video selection for video browsing purposes. This technique combines visual and temporal information to capture the important relations within a scene and between scenes in a video, thus allowing the analysis of the underlying story structure with no a priori knowledge of the content. A general model of hierarchical scene transition graph is applied to an implementation for browsing. Video shots are first identified and a collection of key frames is used to represent each video segment. These collections are then classified according to gross visual information. A platform is built on which the video is presented as directed graphs to the user, with each category of video shots represented by a node and each edge denoting a temporal relationship between categories. The analysis and processing of video is carried out directly on the compressed videos.

What are needed are systems and methods for generating a condensed representation of the contents of a video file in a way that enables a user to obtain both a quick at-a-glance impression of the video contents and a more thorough understanding of the structure of those contents.

SUMMARY

In one aspect, the invention features a method in accordance with which a video file is segmented into video segments and a condensed representation of the video file is generated. The condensed representation corresponds to a concurrent presentation of the video segments in respective windows in a display area over repeating cycles of a loop period.

The invention also features a system and a machine readable medium storing machine-readable instructions for implementing the method described above.

The invention also features a method in accordance with which video segments corresponding to contiguous sections of a video file are concurrently presented in respective windows in a display area over repeating cycles of a loop period.

Other features and advantages of the invention will become apparent from the following description, including the drawings and the claims.

DESCRIPTION OF DRAWINGS

FIG. 8 is a diagrammatic view of an embodiment of a condensed video file representation describing the concurrent presentation of video segments shown in FIGS. 5-7.

FIG. 9 is a diagrammatic view of an embodiment of a display area containing an embodiment of a concurrent presentation of an exemplary set of video segments.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below are capable of generating a condensed representation of the contents of a video file. The condensed representation is based on a concurrent presentation of segments of the video file. The condensed representation is generated in a way that enables users to obtain quick at-a-glance impressions of the video contents and more thorough understandings of the structure of those contents. The embodiments that are described herein may be used in a wide variety of application environments, including video recording devices (e.g., video cameras, VCRs, and DVRs), video editing devices, media asset organization systems, and media asset retrieval systems.

Some of the embodiments that are described herein generate a condensed representation of a video file without requiring any preliminary analysis of the contents of the video file. In this way, these embodiments readily can be implemented in embedded environments, such as video camera and portable video playback application environments, in which one or both of the processing resources and the memory resources are severely constrained, as well as in video streaming application environments in which bandwidth resources are constrained. As explained in detail below, some embodiments also generate a condensed representation of a video file that avoids discontinuities that otherwise might result during the concurrent playback of the video file segments. For example, in some embodiments, the condensed representation specifies a concurrent presentation of video segments in respective moving windows that create an illusion of continuity between successive repetitions of the loop period.

II. Overview

Figure 1:
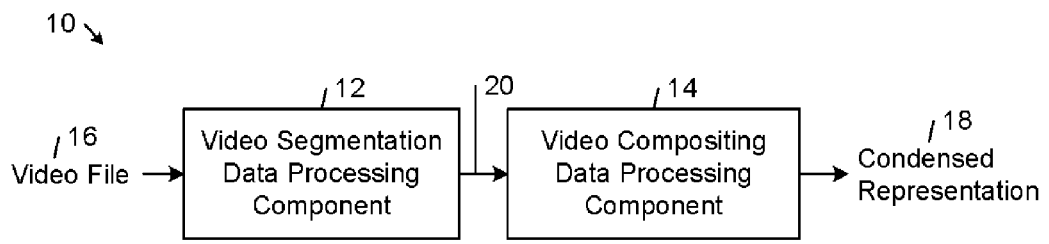
FIG. 1 is a block diagram of an embodiment of a video processing system.

FIG. 1 shows an embodiment of a video processing system 10 that includes a video segmentation data processing component 12 and a video compositing data processing component 14. In operation, the video processing system 10 processes a video file 16 to produce a condensed representation 18 of the contents of the video file 16. The video file 16 typically includes a sequence of video frames and audio data. The video processing system 10 may receive the respective video frames and the audio data as separate data signals or as a single multiplex video data signal. The video file 16 may correspond to an original version of a video (e.g., a commercially produced video, a home video, of a video recorded from a television, cable, or satellite video broadcast) or a processed version of an original video (e.g., a scaled or reduced-resolution version of an original video or an edited version of an original video). In some exemplary embodiments, the pixel resolution (i.e., a count of the pixels in a frame of the original video file) of an original video file initially is scaled down to produce the video file 16.

Figure 2:
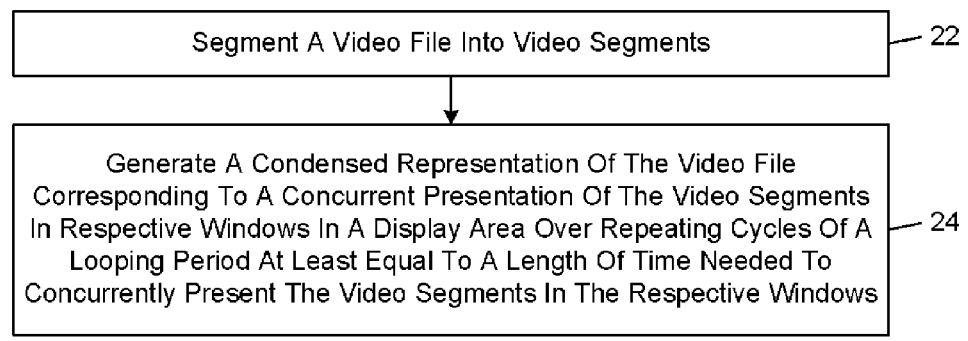
FIG. 2 is a flow diagram of an embodiment of a video processing method.

FIG. 2 shows an embodiment of a method that is implemented by the video processing system 10.

The video segmentation data processing component 12 segments the video file 16 into video segments 20 (FIG. 2, block 22). In general, the video segmentation data processing component 12 may segment the video file 16 to produce the video segments 20 in any of a wide variety of different ways. In some exemplary embodiments, the video segmentation data processing component 12 divides the video file 16 into a set of equal-length video segments. The video segments 20 typically correspond to contiguous nonoverlapping sections of the video file 16 that collectively represent the video file 16 in its entirety. In some embodiments, two or more of the video segments containing overlapping portions of the video file 16. The output of the video segmentation data processing component 12 typically is in the form of data that specifies the video segments 20 by respective start and end indices (or pointers) that demarcate the sections of the video file 16 respectively corresponding to the video segments 20.

The video compositing data processing component 14 generates the condensed representation 18 of the video file 16 (FIG. 2, block 24). The condensed representation 18 corresponds to a concurrent presentation of the video segments 20 in respective windows in a display area over repeating cycles of a loop period. The condensed representation 18 is output by the video compositing data processing component 14. In some embodiments, the condensed representation 18 is output by storing it on a computer-readable medium (e.g., a non-volatile memory or a volatile memory). In other embodiments, the condensed representation 18 is output by rendering it on a display. In other embodiments, the condensed representation 18 is output as an encoded signal that is streamed over a wired or wireless network connection.

The loop period typically is at least equal to a length of time needed to concurrently present the video segments 20 in the respective windows. In some embodiments, the length of the loop period depends on the playback speed of the video segments. For example, depending on the implementation or user preferences, the playback speed of the video segments may be faster, slower, or the same as the playback speed of the original un-segmented video. In one exemplary implementation, the playback speed of the original un-segmented video may be configurably set to 60 frames-per-second (fps), whereas the playback speed of the video segments may be configurably set to 30 fps.

In some embodiments, the condensed representation 18 corresponds to an output video file that can be rendered by a video player to concurrently present the video segments. In these embodiments, the output video file is stored on a machine-readable medium in accordance with a video file format (e.g., AVI, MOV, MPEG-2, MPEG-4, Ogg, ASF, ReadMedia, and 3gp). In some embodiments, the condensed representation 18 corresponds to parsable video playback instructions that cause a machine (e.g., a computer) to present a composite video corresponding to the concurrent presentation of the video segments. In these embodiments, the instructions are stored on a machine-readable medium in accordance with a multimedia authoring scripting language (e.g., Adobe Flash®) that can by run or parsed by a script interpreter (e.g., an Adobe Flash® player) to render the concurrent presentation of the video segments. In some embodiments, the condensed representation 18 corresponds to a video compositing specification (e.g., a script) that describes the way in which the video segments 20 are to be concurrently presented in the display area. In these embodiments, the video compositing specification is processed by a video authoring tool (e.g., Adobe Flash® or AviSynth) that produces an output video file (e.g., an AVI file) or a set of parsable video playback instructions (e.g., an Adobe Flash® script or an AviSynth script) that can be processed to render the concurrent presentation of the video segments.

In some embodiments, the condensed representation 18 specifies that the audio portion of the video file 16 is not to be rendered during the concurrent presentation of the video segments 20. In other embodiments, the condensed representation 18 specifies that the audio portion of the video file 16 corresponding to only one of the video segments 20 is to be rendered at a time. In these embodiments, the audio segments may be rendered in accordance with a default protocol. For example, in some embodiments, during each cycle, successive ones of the video segments are highlighted and the audio data associated with the highlighted video segments are sequentially rendered. In some embodiments, the audio segments are rendered in response to a user input (e.g., the audio data associated with user-selected ones of the video segments are rendered).

III. An Exemplary Video Processing System Architectures

The video processing system 10 may be implemented by one or more discrete data processing components (or modules) that are not limited to any particular hardware, firmware, or software configuration. For example, in some implementations, the video data processing system 10 may be embedded in the hardware of any one of a wide variety of electronic devices, including desktop and workstation computers, video recording devices (e.g., VCRs and DVRs), cable or satellite set-top boxes capable of decoding and playing paid video programming, and digital camera devices. In the illustrated embodiments, the data processing components 12 and 14 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the data processing components 12 and 14 are combined into a single processing component. In some embodiments, the respective functionalities of each of one or more of the data processing components 12 and 14 are performed by a respective set of multiple data processing components.

In some implementations, process instructions (e.g., machine-readable code, such as computer software) for implementing the methods that are executed by the video processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 3:
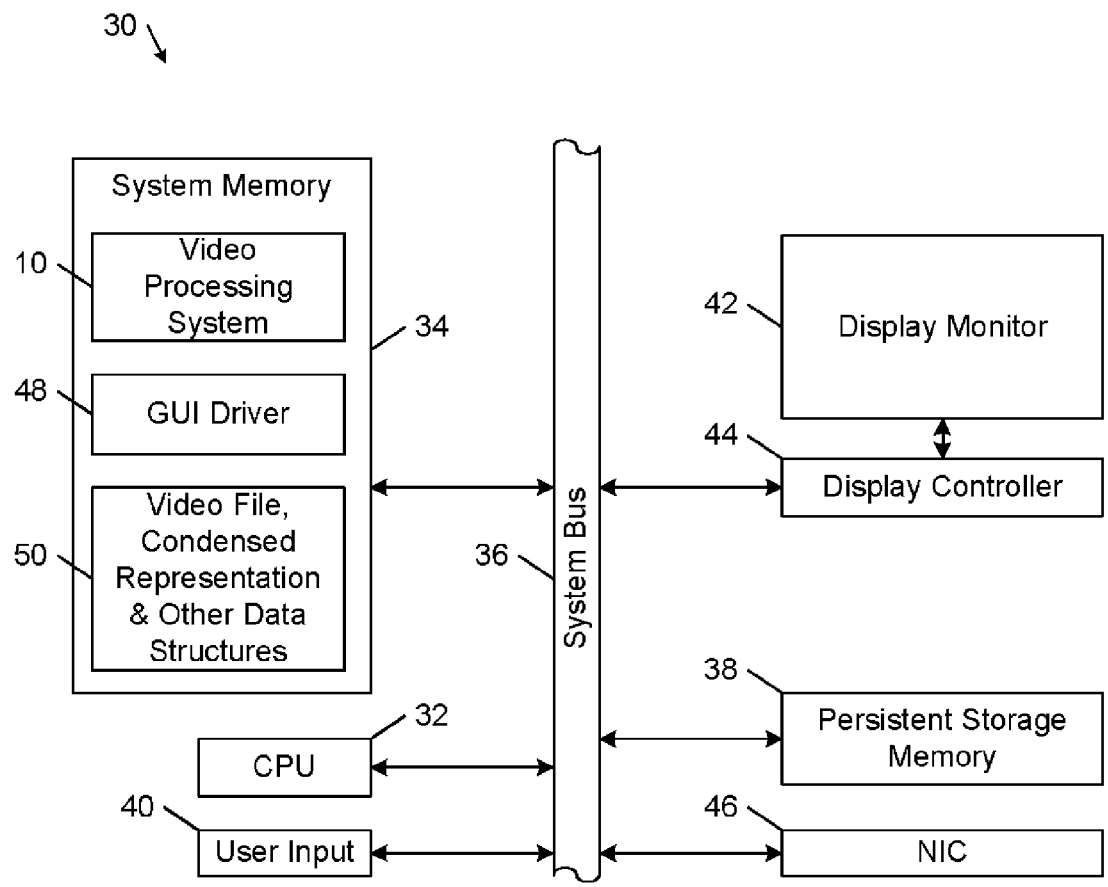
FIG. 3 is a block diagram of a computer system that is programmable to implement an embodiment of the video processing system shown in FIG. 1.

Referring to FIG. 3, in one embodiment, the video processing system 10 is implemented by one or more software modules operating on a computer 30. The computer 30 includes a processing unit 32 (CPU), a system memory 34, and a system bus 36 that couples processing unit 32 to the various components of the computer 30. The processing unit 32 typically includes one or more processors, each of which may be in the form of any one of various commercially available processors. The system memory 34 typically includes a read only memory (ROM) that stores a basic input/output system (BIOS) that contains start-up routines for the computer 30 and a random access memory (RAM). The system bus 36 may be a memory bus, a peripheral bus or a local bus, and may be compatible with any of a variety of bus protocols, including PCI, VESA, Microchannel, ISA, and EISA. The computer 30 also includes a persistent storage memory 38 (e.g., a hard drive, a floppy drive, a CD ROM drive, magnetic tape drives, flash memory devices, and digital video disks) that is connected to the system bus 36 and contains one or more computer-readable media disks that provide non-volatile or persistent storage for data, data structures and computer-executable instructions.

A user may interact (e.g., enter commands or data) with the computer 30 using one or more input devices 40 (e.g., a keyboard, a computer mouse, a microphone, joystick, and touch pad). Information may be presented through a graphical user interface (GUI) that is displayed to the user on a display monitor 42, which is controlled by a display controller 44. The computer 30 also typically includes peripheral output devices, such as speakers and a printer. One or more remote computers may be connected to the computer 30 through a network interface card (NIC) 46.

As shown in FIG. 3, the system memory 34 also stores the video processing system 10, a GUI driver 48, and a database 50 containing the video file 16, the condensed representation 18, and other data structures. The video processing system 10 interfaces with the GUI driver 48 and the user input 40 to control the creation of the condensed representation 18. In some embodiments, the video processing system additionally includes at least one of a video player and a script interpreter that are configured to render the concurrent representation of the video segments 20 by processing the condensed representation 18 of the video file 16. The video processing system 10 also interfaces with the GUI driver 48 and the condensed representation and other data structures to control the concurrent presentation of the video segments 20 to the user on the display monitor 42. The various media objects that are used to render the concurrent presentation may be stored locally in persistent storage memory 38 or stored remotely and accessed through the NIC 46, or both.

IV. Exemplary Embodiments of Concurrent Presentations of the Video Segments

A. Concurrently Presenting Video Segments in Static Windows

As explained above, a concurrent presentation of the video segments 20 may be rendered on the display monitor 42 by a video player or a script interpreter that is configured to process the condensed representation 18 of the video file 16. In this process, the video player or script interpreter concurrently presents the video segments 20 in respective windows in a display area of the display monitor 42. The video segments are presented over repeating cycles of a loop period.

Figure 4:
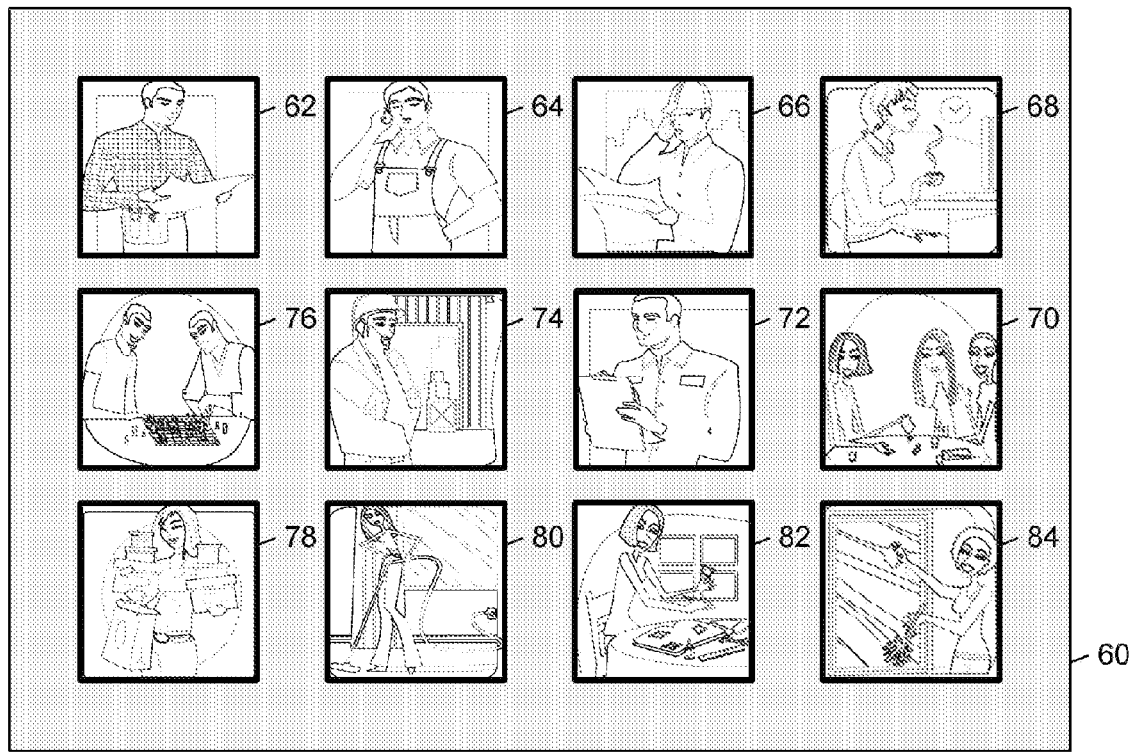
FIG. 4 is a diagrammatic view of an embodiment of a display area containing an embodiment of a concurrent presentation of an exemplary set of video segments.

FIG. 4 shows an embodiment of a display area 60 that contains an embodiment of a concurrent presentation 61 of an exemplary set of twelve video segments 62, 64, 66, 68, 70, 72, 74, 76, 78, 80, 82, 84, which were segmented from a video file. In some embodiments, the display area 60 corresponds to an area (e.g., a window) on the display monitor 42 (see FIG. 3). The video segments 62-84 are presented concurrently in respective windows in the display area over repeating cycles of a loop period. The loop period typically has a length at least as long as the time needed to concurrently present the video segments 62-84 in the respective windows. In operation, each of the video segments 62-84 is rendered in its respective window from start to finish during each cycle of the loop period. In the illustrated embodiment, the locations of the windows in the display area 60 are static.

The windows in which the video segments 62-84 are rendered typically are distributed as a sequence that is ordered in a way that preserves the temporal ordering of the video segments 62-84 in the original un-segmented video file. In some embodiments, the windows are distributed as a sequence in one or more straight lines (e.g., horizontal rows, vertical columns, or diagonal lines) in the display area. For example, in some embodiments, the window sequence is distributed in a zigzag pattern of rows from the top left corner of the display area 60 to the bottom right corner of the display area 60. In other embodiments, the window sequence is distributed in a zigzag pattern of rows from the top right corner of the display area 60 to the bottom left corner of the display area 60. In other embodiments, the window sequence is distributed as a sequence in one or more curved lines (e.g., in a spiral pattern) in the display area, which originates either at in a central region of the display area 60 or a peripheral region of the display area 60. In some embodiments, the sequence of windows is distributed in a selected reading order pattern. For example, in some exemplary embodiments the window sequence is distributed in a series of rows and ordered from left-to-right in each row and from the top row to the bottom row across the display area (i.e., in the order in which English text typically is presented). In other embodiments the window sequence is distributed in a series of rows and ordered from right-to-left in each row and from the top row to the bottom row across the display area (i.e., in the order in which text is presented for many non-English languages, such as Middle Eastern languages).

The concurrent presentation of the video segments 62-84 shown in FIG. 4 enables users to obtain both a quick at-a-glance impression of the contents of the original un-segmented video file as well as a more thorough understanding of the structure of those contents. For example, a user may quickly view some of the rendered contents of all of the video segments to get a sense of the contents of the original un-segmented video file. A user may view the contents of original un-segmented video file in its entirety by sequentially viewing the contents of each of the video segments over multiple (e.g., twelve or more) cycles of the loop period.

B. Concurrently Presenting Video Segments in Dynamic Windows

Figure 5:
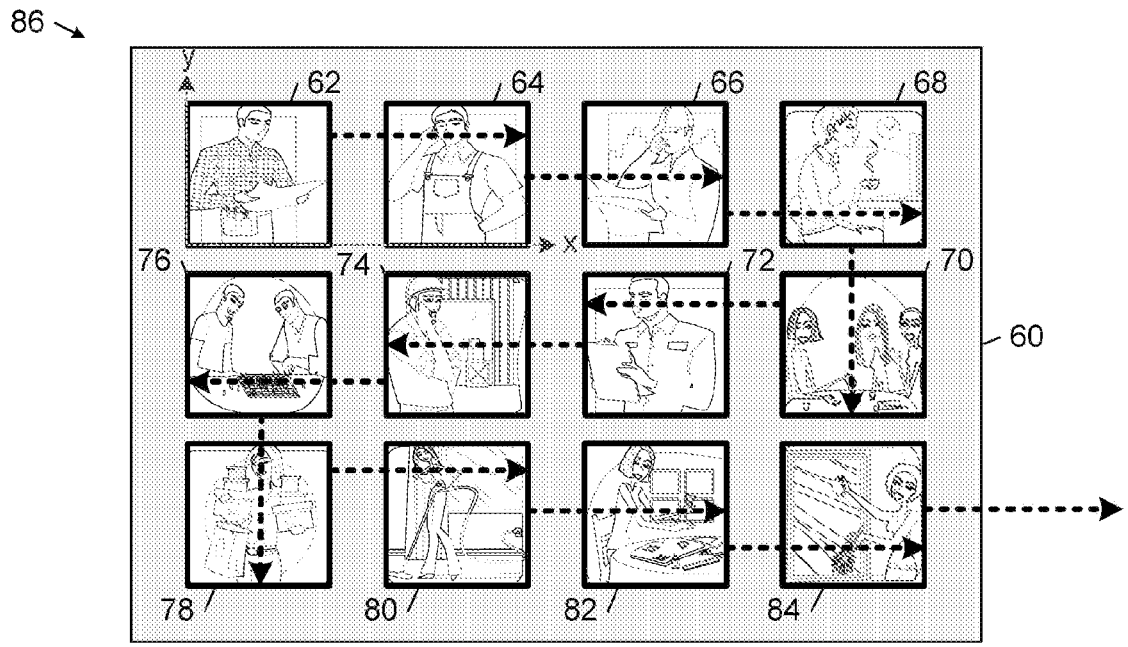
FIG. 5 is a diagrammatic view of an embodiment of a display area containing an embodiment of a concurrent presentation of an exemplary set of video segments in their respective start positions.

FIG. 5 shows an embodiment of the display area 60 that contains an embodiment of a concurrent presentation 86 of the exemplary set of twelve video segments 62-84 shown in FIG. 4. The concurrent presentation 86 corresponds to the concurrent presentation 61 shown in FIG. 4, except that in the concurrent presentation 86 the video segments 62-84 are rendered in dynamic windows. In this embodiment, the windows are distributed as a sequence that is ordered in a way that preserves the temporal ordering of the video segments 62-84 in the original un-segmented video file. In particular, the window sequence is distributed in a zigzag pattern of rows from the top left corner of the display area 60 to the bottom right corner of the display area 60. For each of the windows in the odd numbered rows (e.g., the first and third rows), the end position leads the start position with respect to the positive x-direction, which is parallel to the rows of windows, and for each of the windows in the even numbered rows (e.g., the second row), the end position trails the start position with respect to the positive x-direction.

Figure 6A:
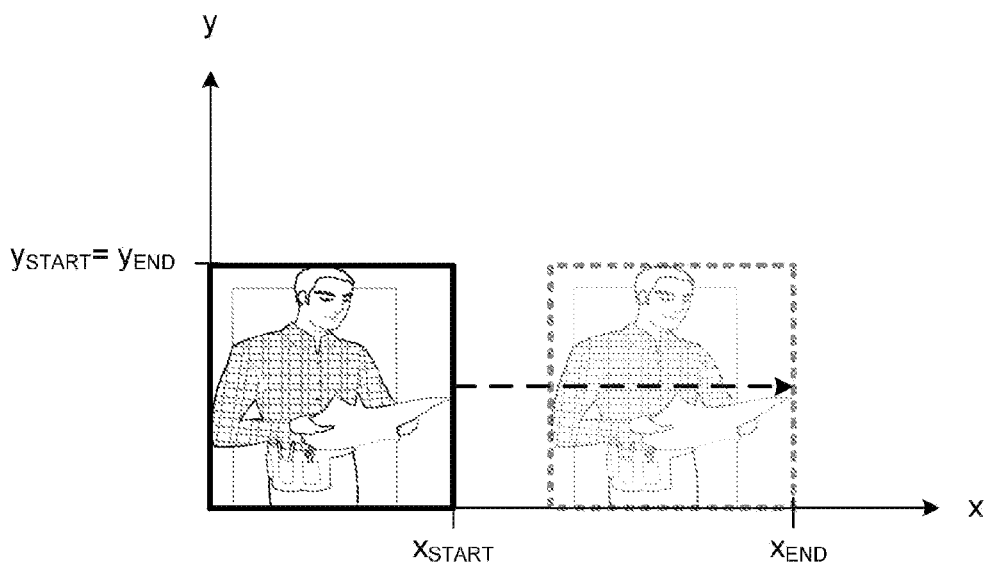
FIG. 6A is a graph of position in the display area of FIG. 5 showing movement of one of the video segments from a start position to a end position.
Figure 6B:
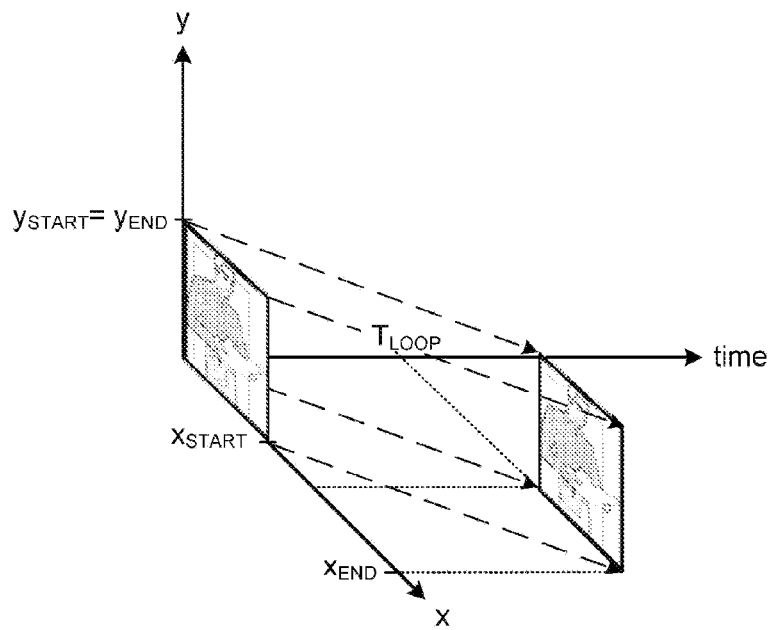
FIG. 6B is a graph of the position of the video segment shown in FIG. 6A plotted as a function of time.

During each cycle of the loop period, each of the windows moves from a respective start position to a respective end position, as indicated by the dashed arrows shown in FIG. 5. FIG. 6A shows a graph of the start position and the end position (shown in phantom) of the window in which the video segment 62 is rendered. FIG. 6B shows a graph of the start position and the end position of the same window plotted as a function of time. As shown in FIGS. 6A and 6B, over the course of each cycle of the loop period ($T_{LOOP}$), the upper right corner of the window moves from the coordinate ($x_{START}$, $y_{START}$) to the coordinate ($x_{END}$, $y_{END}$), where $y_{START}=y_{END}$.

Figure 7:
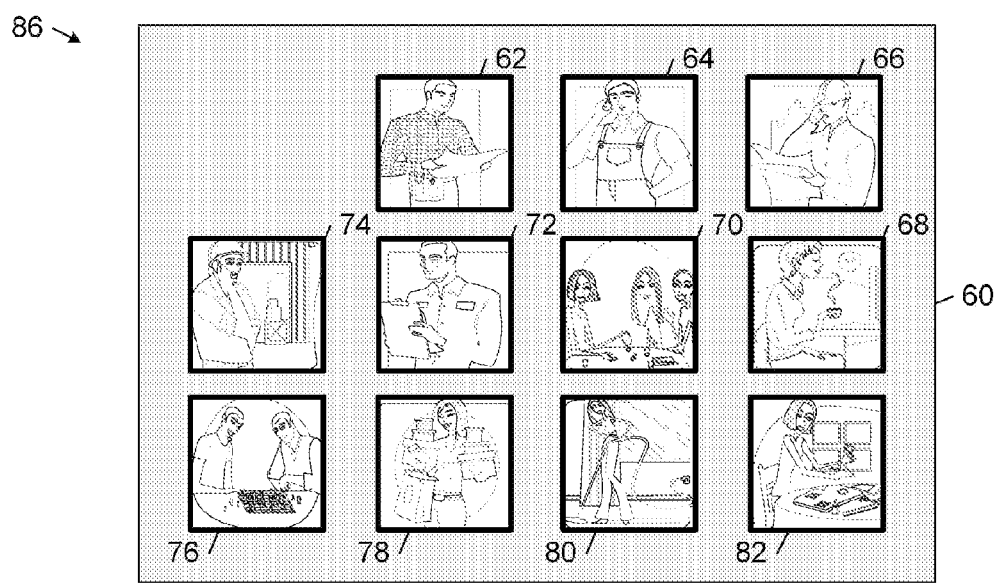
FIG. 7 is a diagrammatic view of the display area of FIG. 5 with the exemplary set of video segments presented in their respective end positions.

Each start position corresponds to a position in the display area 60 where the respective video segment is presented when each cycle of the loop period begins (see FIG. 5). Each end position corresponds to a position in the display where the respective video segment is presented when each cycle of the loop period ends (see FIG. 7). As shown in FIG. 7, at the end of each loop period, the end positions of respective ones of the windows are at or near the start positions of successive ones of the windows in the sequence. This feature reduces the perception of discontinuities that otherwise might result at the transitions between loop cycles during the concurrent playback of the video file segments 62-84.

In some embodiments, the start and end positions of the windows are related as follows. For the purpose of the following discussion, assume that N is the number of frames in the loop, D is the linear distance between successive windows on a selected one of the lines, X is the start position of a given window on the selected line, X' is the start position of the next window on the selected line (i.e., X'=X+D). In this case, the end position of the first window is given by X+D×(N−1)/N, which can be rewritten as X'−D/N. Thus, in these embodiments, the end position of each window is a distance of D/N before the start position of the next window. Typically, the distance D/N is only a few pixels. Arranging the start and end positions in this way avoids the perception of jerkiness during the transitions at the end of the loop period and thereby promotes the illusion of continuous movement of the windows. Note that all of the calculations described above typically are performed on real numbers. In some implementations, these calculations may be rounded to the nearest integer pixel value.

In the illustrated embodiments, the start and end frames of the video segments 62-84 are represented by the same image for ease of illustration purposes only. In actual embodiments, the start and end frames of each of the video segments of the video file 16 typically are different. In some embodiments, in order to preserve the visual continuity of the original un-segmented video, the end frame of each preceding video segment (e.g., video segment 62) and the start frame of the following video segment (e.g., video segment 64) respectively correspond to successive frames of the original, un-segmented video.

In general, the condensed representation specifies for each of the windows a sequence of positions in the display area where frames of the respective video segment are presented during the loop period.

FIG. 8 shows an embodiment of a condensed representation 90 that corresponds to a video compositing specification (e.g., a script in the form of a text file) that describes the way in which the video segments 62-84 are concurrently presented in the display area 60 in accordance with the concurrent presentation 86 shown in FIGS. 5 and 7. The condensed representation 90 identifies the original un-segmented video file (i.e., video_1), the number of segments into which the video file is segmented (i.e., num_segments=12), and specifies the start positions (xi_start, yi_start, i=60+2j for all j=1 to 12) and the end positions (xi_end, yi_end, i=60+2j for all j=1 to 12) of the windows in which the video segments are to be rendered. In this embodiments, the video compositing specification is processed by a video authoring tool (e.g., Adobe Flash® or AviSynth) that produces a set of parsable video playback instructions (e.g., an Adobe Flash® script or an AviSynth script) or an output video file (e.g., an AVI file) that can be processed to render the concurrent presentation of the video segments. For example, an embodiment of a video authoring tool is configured to interpret the condensed representation 90 as instructions to segment the video file "video_1" into twelve equal-length segments and to composite the video segments in a display area in accordance with the start and end positions specified for the video segments.

With the concurrent video segment presentation embodiment shown in FIGS. 5-7, a user may quickly view some of the rendered contents of all of the video segments to get a sense of the contents of the original un-segmented video file. A user also may view the contents of original un-segmented video file in its entirety by sequentially viewing the contents of each of the video segments over successive cycles of the loop period. In this process, the movements of the windows guide the user's gaze from the video segments currently being viewed to the locations where the next successive video segments will be rendered. In accordance with this guidance, the user's gaze typically will traverse the zigzag pattern of window shifts across the display area 60 over the course of viewing twelve (or more) cycles of the loop period.

FIG. 9 shows an embodiment of the display area 60 that contains an embodiment of a concurrent presentation 92 of the exemplary set of twelve video segments 62-84 shown in FIG. 5. The concurrent presentation 92 corresponds to the concurrent presentation 86 shown in FIG. 5, except that in the concurrent presentation 92 the video segments 62-84 are rendered in a way that avoids the empty window location in the upper left corner of the display area at the end of the loop period (see FIG. 7). In this embodiment, the windows are distributed as a sequence that is ordered in a way that preserves the temporal ordering of the video segments 62-84 in the original un-segmented video file. In particular, the window sequence is distributed as a sequence in three rows that extend across the display area 60.

As shown in FIG. 9, each of the rows includes a respective window location that falls outside the display area 60. For example, at the initial point in the loop period (shown in FIG. 9), the locations of the windows for video segments 62, 70, and 76 (shown in phantom) are outside of the display area 60. During each cycle of the loop period, each of the windows moves from its respective start position to its respective end position, as indicated by the dashed arrows shown in FIG. 9. In this process, the windows for the video segments 62, 70, and 76 move into the display area 62 and the windows for the video segments 70, 78, and 84 move outside of the display area 60. Over the course of the loop period, the windows seamlessly shift across the display area 60 without introducing an empty window location. In the embodiment shown in FIG. 9, the video segments 76 and 78 are redundantly presented in the display area 60 to fill-in the lower left corner of the display area 60. In other embodiments, the windows may be arranged in a different way that avoids the redundant presentation of video segments.

C. Interactive Concurrent Presentation of Video Segments

Figure 10:
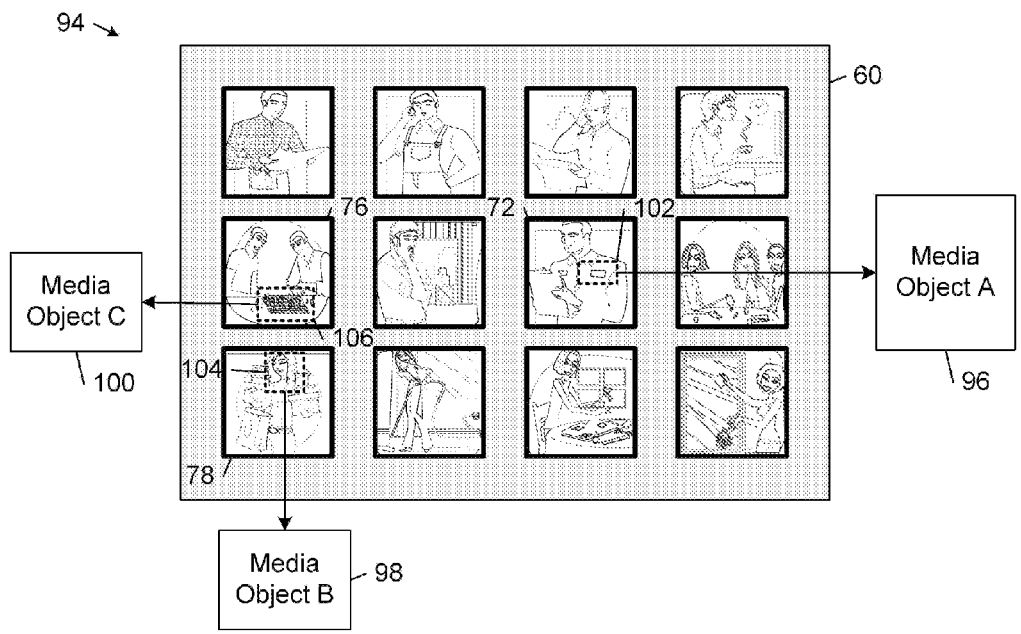
FIG. 10 is a diagrammatic view of an embodiment of a display area containing an embodiment of a concurrent presentation of an exemplary set of video segments three of which are associated with respective media objects.

FIG. 10 shows an embodiment of the display area 60 containing an embodiment of a concurrent presentation 94 of the exemplary set of twelve video segments 62-84 shown in FIGS. 4 and 5. The concurrent presentation 94 corresponds to the concurrent presentation 61 shown in FIG. 4 and the concurrent presentation 86 shown in FIG. 5, except that in the concurrent presentation 94 the video segments 72, 76, and 78 are associated with respective media objects 96, 98, 100.

As used herein, the term "media object" refers broadly to any form of digital content, including text, audio, graphics, animated graphics and full-motion video. This content may be packaged and presented individually or in some combination in a wide variety of different forms, including documents, annotations, presentations, music, still photographs, commercial videos, home movies, and meta data describing one or more associated digital content files. The media objects may be stored physically in a local database or in one or more remote databases that may be accessed over a local area network and a global communication network. Some media objects also may be stored in a remote database that is accessible over a peer-to-peer network connection.

In some embodiments, the condensed representation for the concurrent presentation 94 corresponds to parsable video playback instructions that cause a machine (e.g., a computer) to present a composite video corresponding to the concurrent presentation 94. In these embodiments, the instructions are stored on a machine-readable medium in accordance with a multimedia authoring scripting language (e.g., Adobe Flash®) that can by run or parsed by a script interpreter to render the concurrent presentation 94. The video playback instructions include instructions that cause a machine (e.g., computer) to associate (e.g., with respective hyperlinks or pointers) one or more user-selectable parts of the presented composite video with the respective media objects 96-100. In the embodiment shown in FIG. 10, the video playback instructions include a specification of active links that respectively associate user-selectable regions 102, 104, 106 of the video segments 72, 76, 78 with the media objects 96-100. In response to a determination that one of the user-selected regions 102-106 has been selected (e.g., by clicking the region with a computer mouse pointer or by positioning a computer mouse pointer over the region), the video playback instructions cause the machine to render the associated one of the media objects 96-100.

Figure 11:
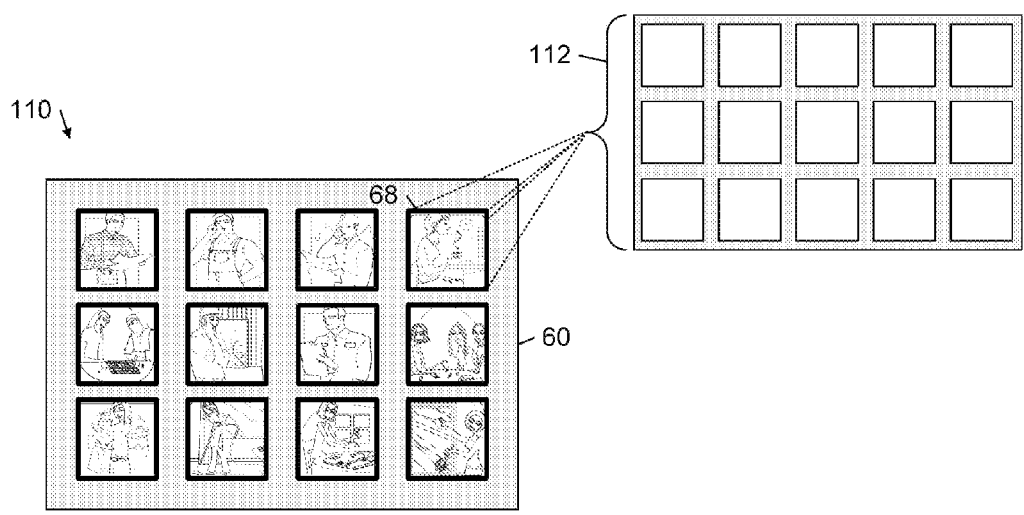
FIG. 11 is a diagrammatic view of an embodiment of a display area containing an embodiment of a concurrent presentation of an exemplary set of video segments one of which is associated with a media object specifying a concurrent presentation of sub-segments of the associated video segment.

FIG. 11 shows an embodiment of the display area 60 containing an embodiment of a concurrent presentation 110 of the exemplary set of twelve video segments 62-84 shown in FIGS. 4 and 5. The concurrent presentation 110 corresponds to the concurrent presentation 61 shown in FIG. 4 and the concurrent presentation 86 shown in FIG. 5, except that in the concurrent presentation 110 the video segment 68 is associated with a media object 112, which specifies a concurrent presentation of sub-segments of the associated video segment 68. The media object 112 may be generated by applying the concurrent presentation methods described herein to the video segment 68.

In the embodiment shown in FIG. 11, the condensed representation for the concurrent presentation 110 corresponds to parsable video playback instructions that cause a machine (e.g., a computer) to present a composite video corresponding to the concurrent presentation 110. In these embodiments, the instructions are stored on a machine-readable medium in accordance with a multimedia authoring scripting language (e.g., Adobe Flash®) that can by run or parsed by a script interpreter to render the concurrent presentation 110. The video playback instructions include instructions that cause a machine (e.g., computer) to associate (e.g., with respective hyperlinks or pointers) one or more user-selectable parts of the presented composite video with the media object 112. In the embodiment shown in FIG. 11, the video playback instructions include a specification of an active link that associates a user-selectable region of the video segment 68 with the media object 112. In response to a determination that the user-selected region has been selected (e.g., by clicking the region with a computer mouse pointer or by positioning a computer mouse pointer over the region), the video playback instructions cause the machine to render the media object 112.

V. Conclusion

The embodiments that are described herein are capable of generating a condensed representation of the contents of a video file. The condensed representation is based on a concurrent presentation of segments of the video file. The condensed representation is generated in a way that enables users to obtain quick at-a-glance impressions of the video contents and more thorough understandings of the structure of those contents.

Other embodiments are within the scope of the claims.

What is claimed is:

1. A method, comprising:
    segmenting a video file into video segments; and
    generating a condensed representation of the video file
        corresponding to a concurrent presentation of the video segments in respective windows in a display area over repeating cycles of a loop period;

wherein the condensed representation includes for each of the windows a start position corresponding to a position in the display area where the respective video segment is presented when each cycle of the loop period begins and an end position corresponding to a position in the display area where the respective video segment is presented when each cycle of the loop period ends, wherein for each of the windows the start position and the end position are different.

2. The method of claim 1, wherein the segmenting comprises dividing the video file such that the video segments have equal lengths.

3. The method of claim 1, wherein the segmenting comprises dividing the video file such that the video segments correspond to contiguous nonoverlapping sections of the video file that collectively represent the video file in its entirety.

4. The method of claim 1, wherein the segmenting comprises for each of the video segments determining a respective begin point in the video file and a respective end point in the video file.

5. The method of claim 1, wherein the condensed representation specifies that the windows are distributed as a sequence in one or more lines across the display area, and in each of the lines the end positions of respective ones of the windows correspond to the start positions of successive ones of the windows in the sequence.

6. The method of claim 5, wherein the end position leads the start position with respect to a reference direction parallel to the one or more lines for each of the windows in a first one of the lines, and the end position trails the start position with respect to the reference direction for each of the windows in a second one of the lines adjacent the first line.

7. The method of claim 1, wherein the condensed representation specifies for each of the windows a sequence of positions in the display area where frames of the respective video segment are presented during the loop period.

8. The method of claim 1, further comprising producing an output video file in accordance with the condensed representation.

9. The method of claim 1, further comprising producing instructions operable to cause a machine to perform operations comprising presenting a composite video in accordance with the condensed representation, and outputting the instructions.

10. The method of claim 9, wherein the instructions additionally are operable to cause the machine to perform operations comprising: associating a user-selectable part of the presented composite video with a media object; and presenting the media object in response to a determination that the user-selected part has been selected.

11. The method of claim 10, wherein the media object specifies a concurrent presentation of sub-segments of one of the video segments.

12. A non-transitory machine readable medium storing machine-readable instructions causing a machine to perform operations comprising:

segmenting a video file into video segments; and generating a condensed representation of the video file corresponding to a concurrent presentation of the video segments in respective windows in a display area over repeating cycles of a loop period;

wherein the condensed representation includes for each of the windows a start position corresponding to a position in the display area where the respective video segment is presented when each cycle of the loop period begins and an end position corresponding to a position in the display area where the respective video segment is presented when each cycle of the loop period ends, wherein for each of the windows the start position and the end position are different.

13. Apparatus, comprising:

a memory storing processor-readable instructions; and a processor coupled to the memory, operable to execute the instructions, and based at least in part on the execution of the instructions operable to perform operations comprising segmenting a video file into video segments; and generating a condensed representation of the video file corresponding to a concurrent presentation of the video segments in respective windows in a display area over repeating cycles of a loop period;

wherein the video compositing data processing component generates the condensed representation to include for each of the windows a start position corresponding to a position in the display area where the respective video segment is presented when each cycle of the loop period begins and an end position corresponding to a position in the display area where the respective video segment is presented when each cycle of the loop period ends, wherein for each of the windows the start position and the end position are different.

14. A method, comprising:

concurrently presenting video segments in respective windows in a display area over repeating cycles of a loop period, wherein the video segments correspond to contiguous sections of a video file; wherein the presenting comprises presenting each of the video segments in the respective window at a respective start position in the display area when each cycle of the loop period begins and presenting each of the video segments in the respective windows at a respective end position in the display area when each cycle of the loop period ends, wherein for each of the windows the start position and the end position are different.

15. The method of claim 14, wherein the presenting comprises distributing the windows in a sequence in one or more lines across the display area, and in each of the lines the end positions of respective ones of the windows correspond to the start positions of successive ones of the windows in the sequence.

16. The method of claim 15, wherein the presenting comprises moving each of the windows from the respective start position to the respective end position during each cycle of the loop period.

* * * * *